Nov. 6, 1945.    R. M. NELSON    2,388,432
VACUUM BREAKER
Filed Jan. 16, 1943

INVENTOR
RALPH M. NELSON
BY *J. J. Gilling, Jr.*
ATTORNEY

Patented Nov. 6, 1945

2,388,432

UNITED STATES PATENT OFFICE 2,388,432

VACUUM BREAKER

Ralph M. Nelson, River Forest, Ill., assignor to Sloan Valve Company, Chicago, Ill., a corporation of Illinois Application January 16, 1943, Serial No. 472,606

1 Claim. (Cl. 137—69)

This invention relates in general to vacuum breakers for water supply systems, and the principal object of the invention is to provide a new and improved vacuum breaker having desirable advantages over known types of vacuum breakers.

Vacuum breakers are usually provided in water supply systems where there is danger that back syphonage will occur and create a hazardous health condition whenever a vacuum condition is present in the water supply pipe line. The provision of vacuum breakers in connection with sanitary plumbing fixtures such as water closet installations is mandatory in practically all communities at the present time and usually is furnished as standard equipment with the plumbing fixtures to guard the health of the community. This almost universal use of vacuum breakers makes it necessary that precautions be exercised to insure the safe and reliable operation of the devices under all conditions in which they may be used, but up to the present time no known means have been provided which can detect any inoperativeness of the devices.

It is customary to provide vacuum breakers with a hinged valve member which is adapted to swing into engagement with an air inlet seat upon the passage of water through the vacuum breaker, in order to obviate leakage through the air inlet passage. When a vacuum condition occurs, however, in the water supply pipe line, the valve member automatically swings in the opposite direction into engagement with the water inlet seat, to prevent back syphonage and at the same time widely opens the air inlet which is thereby effective to break the vacuum condition.

After a period of extended use, foreign matter may accumulate upon the valve member or the valve seats, or corrosive action may take place due to the constant wetting and drying of the parts and to chemical action between the rubber valve and the brass air inlet seat. Subsequently the aforesaid accumulation of foreign matter becomes somewhat hardened and acts as an adhesive to seal or "freeze" the valve member more or less permanently upon one of the valve seats. In the event that this sealing action takes place with the air inlet seat, it will be readily apparent that the occurrence of a vacuum condition will fail to automatically swing the valve member away from the air inlet seat and this failure will result in the contents of the sanitary fixture being syphoned back into the supply pipe line. This inoperative condition of the valve member will not be apparent and cannot be detected since the vacuum breaker readily permits the free passage of water through it. The precise position of the valve member cannot be ascertained without completely dismantling or removing the vacuum breaker device from the sanitary fixture with which it is associated. This condition may persist indefinitely without detection and will eventually endanger a community by contaminating the entire water supply system.

It is accordingly an object of the present invention to provide a new and improved vacuum breaker in which the exact position of the valve member is readily perceived and in which any operativeness of the device will at all times be apparent without dismantling the same.

A further object is to provide a vacuum breaker in which the rubber valve seating member and air inlet seat are so constituted that the danger of "freezing" or sticking of the valve member upon the seat due to chemical action is greatly minimized.

It is necessary in vacuum breakers to provide some safeguard or protection around the air inlet opening or passage leading from the atmosphere to the air inlet valve seat. This protection of the air inlet opening is usually in the form of a hood or screen to prevent the introduction of insects or foreign objects into the interior of the vacuum breaker. It is difficult to perceive when a clogged condition of these air openings occurs and since this results in a restriction in the area of the air opening if not a complete obstruction of the same, it will be apparent that there is danger that back syphonage will take place upon the occurrence of a vacuum condition in the supply pipe line.

It is accordingly a further object of the invention to provide a vacuum breaker in which condition of the air inlet passage is readily observable at all times and the presence of foreign objects may be readily detected.

With the above and other objects in view which will appear as the nature of the invention is better understood, the same consists in the improved construction and novel arrangements of parts which will hereinafter be fully described and particularly pointed out in the claim hereto appended.

In the accompanying drawing there is illustrated several preferred forms of the invention, in which:

Fig. 4 is a further modification of the vacuum breaker, while

The vacuum breaker disclosed herein is generally of the construction disclosed and claimed in Patent 2,302,151, issued to W. E. Sloan and I. H. Russell November 17, 1942, but certain features of the present invention constitute an improvement thereon and are distinguished therefrom as will be pointed out.

Figure 1:
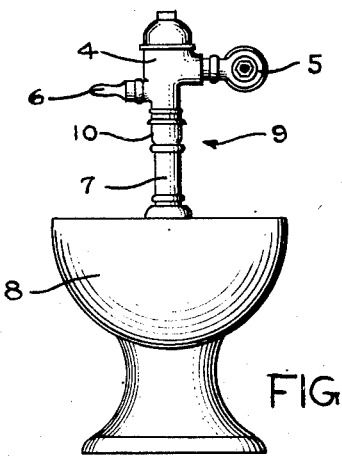
Fig. 1 is a front view of a water closet installation including a flush valve equipped with a vacuum breaker embodying the features of the invention.

Referring to the drawing, Fig. 1 is a view showing a vacuum breaker embodying the present invention, used in connection with an ordinary water closet for example. As shown, a flush valve or metering valve 4 of well known construction is provided with the usual adjustable throttle or stop valve 5 arranged in the water supply line. The flush valve 4 is provided with the handle 6, which upon being operated causes the flush valve to be actuated and pass a metered quantity of water. The outlet of the flush valve 4 is provided with a discharge pipe 7 which discharges the metered quantity of water directly into the closet bowl 8 and effects a flushing operation of the contents thereof. Arranged in position between the outlet end of the flush valve 4 and the closet bowl 8, is a vacuum breaker indicated generally at 9 and embodying one form of the invention. As is apparent from Fig. 1, if the vacuum breaker is of the type disclosed in the aforementioned patent, there is no assurance after its installation that it will always be in continuous proper operating condition, since the flush valve 4 readily functions to flush the toilet bowl 8 each time in the proper manner.

In one of its preferred constructions the vacuum breaker 9 comprises an outer cylindrical casing 10 having an annular inlet fitting 11 arranged on its upper end which is internally threaded to engage the lower body portion of the flush valve 4 and support the vacuum breaker in position. A flange portion 12 set in an annular slot in the fitting 11 and suitably fused as indicated at 13 rigidly secures these two parts together as a unit. At the lower outlet end of the vacuum breaker the tail piece 7 is connected thereto and is limited in its insertion therein by the internal ledge 14, the connection being made by means of the slip joint including the compressible rubber packing 15 and the coupling nut 16. This mounting of the vacuum breaker immediately below the flush valve and somewhat above the bowl 8 places it in a position as seen in Fig. 1 where it is readily visible for close inspection and since it forms a part of the connection, is relatively inconspicuous.

Figure 5:
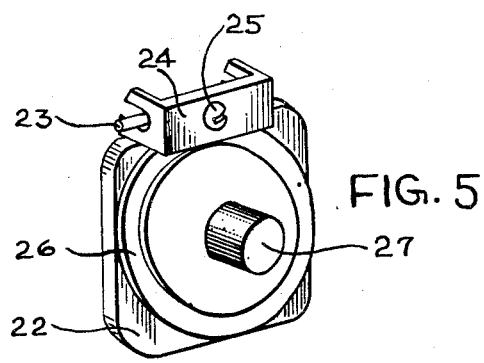
Fig. 5 is a perspective view of the valve member incorporated in the vacuum breaker.

The inner elements of the vacuum breaker include the cylindrical casing 17 inserted from the top of the outer casing 10 concentric therewith and limited in its insertion by the ledge 14, suitable sealing means such as the rubber packing ring 18 sealing the top ends of the casings. Extending diagonally within the inner casing 17 is a partition 19 having an annular opening 20 therein which constitutes the water inlet opening, while the wall of the casing is provided with a side opening 21 which constitutes the air inlet opening for the device. The edges of these openings 20 and 21 define the water inlet and air inlet seats respectively, which are adapted to be closed by a valve member 22 arranged for free swinging movement between the two seats and hinged at its upper end by pin 23 resting between the forked ends of a bracket 24, the bracket in turn being secured to the inner casing wall by the screw 25. The assembly of the valve member 22 and associated parts is more clearly seen in the drawing of Fig 5. In order to insure seating with the air inlet seat 21, the valve member 22 is provided with a rubber seating disc 26 and a weight member 27 secured to one side of the valve member 22 serves as a biasing means to balance the valve member normally in a position between the two valve seats, but preferably somewhat closer to the water inlet seat 20 as shown. The weight 27 helps to insure that the valve member 22 will always move away from the air inlet seat 21 after a flushing operation under all ordinary conditions of operation.

Communication between the inside of the inner casing 17 and the outside of outer casing 10 is established through the air openings 28 around the top of the casing 10, a series of junction portions 29 connecting the bottom portion of casing 10 with its annular flanged portion 12. In order to protect the air inlet openings 28 from entry or insertion of foreign matter as much as possible, a hooded annular portion 30 on the inlet fitting 11 is provided and arranged to overhang the air openings. It will be noted that an air chamber 31 and 32 exists between the two casings 10 and 17. This is provided to catch any slight splashing or leakage which may be caused by operation of the device and to permit this leakage to drain into the outlet 7 through the air inlet passage 21 after the device has been actuated.

In the normal operation of the vacuum breaker, the passage of water through it causes the valve member 22 to close tightly upon the air inlet seat 21 closing off the air passage and opening wide the water inlet 20. When the flow ceases, the weight 27 causes the valve member 22 to move off of the air inlet seat 21 to a position between the two valve seats. Upon the occurrence of a vacuum condition in the system originating above the vacuum breaker, the valve member 22 is caused to move onto the water inlet seat 20 closing off the same and preventing contaminated water in the bowl 8 from being sucked upward through pipe 7. At the same time, the air inlet opening 21 is opened widely permitting atmospheric pressure to pass through air inlets 28 effectively breaking the vacuum condition. Under ordinary conditions, the device functions as stated. However, under abnormal conditions such as when the device is subjected to an indefinite continuous flow of water, hot water is passed through it, or the water has a large amount of corrosive chemicals in it, the valve member 26 may stick against the air inlet seat 21 and become welded to it due to the chemical corrosive action taking place between the rubber seat of the valve member 22 and the air inlet seat 21. Under such circumstances the device is rendered inoperative for its purpose and since the condition cannot possibly be observed without dismantling the device the health of a community is seriously endangered.

Figure 2:
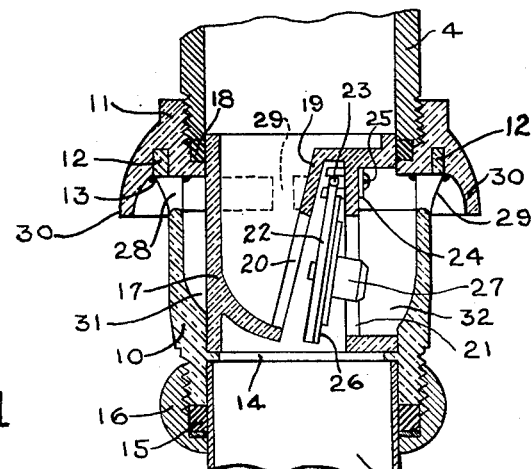
Fig. 2 is a cross-sectional side view of the preferred form of vacuum breaker shown in Fig. 1.

According to the present invention, the outer cylindrical casing 10 of Figs. 1 and 2 is constructed of a material which is entirely transparent so that the internal elements which this casing surrounds can be readily visible from the exterior. The inner casing 17 likewise is preferably made of a transparent material, both casings utilizing as the transparent material any clear glass, or plastic substance which is easily moulded or ormed into the desired shape. An example of materials readily lending themselves to this purpose and at present available commercially are the clear transparent plastics known to the trade as "Lucite," "Tenite," "Styron" and many others. With such a construction, the exact operation of the valve member 22 can be constantly observed and its movement between the associated valve seats quickly checked. The position of the vacuum breaker above the closet bowl 8 is high enough so that inspection is easily made and since the vacuum breaker is connected up on the outlet low pressure side of the flush valve 4, the material of which it is made need not have great tensile strength.

In the event that the valve member 22 should become stuck or "freeze" upon the air inlet seat 21 as has been explained, this condition can be observed immediately because of the transparency of the two casings 10 and 17, and the abnormal hazardous condition be corrected by dismantling the vacuum breaker and repairing or replacing the same, it being understood, of course, that the valve member 22 is made of an opaque material so that it is visible in all of its positions. The inner casing 17 can be positioned in the outer casing 10 so that the valve member 22 is viewed either from the position shown in Fig. 2 or a position from the left side of this drawing. In either event, the condition of the valve with respect to opening 21 can be readily ascertained. The combination fitting 11 and hood portion 30 are also made of a transparent material so that should the air inlet openings 28 become obstructed by foreign material or partially so, the condition can be quickly detected through the transparent hood 30 and removed so that a large free passage for air to the interior of the device is effective to break a vacuum condition.

Another advantage of constructing the casings of plastic material is that this material is relatively inert to chemical action or corrosive effects in the presence of water and therefore the possibility of the rubber seat of the valve member 22 sticking upon the air inlet or water inlet seat is greatly minimized.

By molding the casings 10 and 17 and fitting 11 of the relatively inexpensive plastic material, fewer parts are required in the device, resulting in a reduction in the cost as well as facilitating the assembly of the same.

Figure 3:
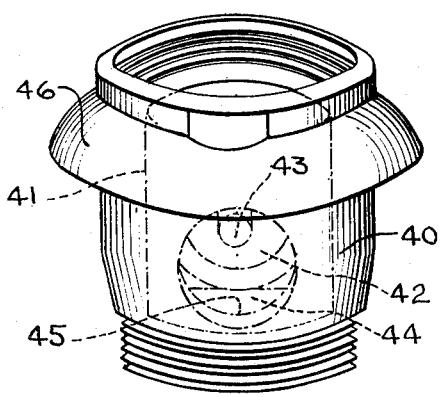
Fig. 3 is a perspective view of a modified form of the vacuum breaker of Fig. 1.

Referring to the modification shown in Fig. 3, this shows an outer casing 40 made of a transparent plastic material while the inner casing 41 may be made of brass tubing, for example, of the type disclosed in the prior mentioned Patent 2,302,151. With such an arrangement, the position of valve member 42 with its weight 43 can readily be observed through the transparent outer casing 40, and the spacing 44 between the valve member 42 and the associated air inlet seat 45 at all times indicates that the device is in its correct operating position. The transparent hood 46 also serves to render the air inlet openings such as 28 of Fig. 2 visible for inspection.

Figure 4:
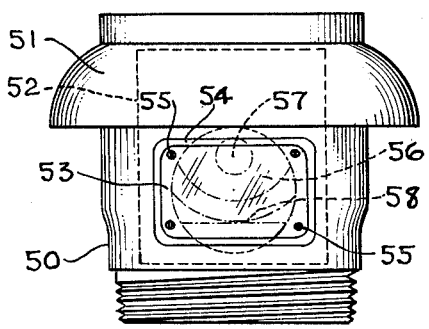

In the modification illustrated in Fig. 4, both the outer casing 50 and the hooded portion 51, as well as the inner casing 52, are constructed of an opaque material such as brass, and in order to observe whether the inner mechanism is functioning properly, an opening is cut in the side of outer casing 50 and covered over with a window 53 sealed with a gasket 54 and held in place by the screws 55. The relative position of the valve member 56 and its weight 57 with respect to the air inlet seat 58 may be quickly perceived at all times. This modification lends itself readily to existing installations where it is not feasible to provide a new transparent vacuum breaker arrangement such as in Fig. 2.

While several modifications of the invention have been disclosed and described, it is clear that the broad general principles are applicable to many other variations and it is therefore to be understood that the invention is not to be limited to the precise forms illustrated but only by the scope of the limitations expressed in the appended claim.

What is claimed is:

In a vacuum breaker, a one-piece valve body including a generally cylindrical side wall, a vertical partition, and an inclined partition, said partitions being integral with said side wall and defining, with said side wall, a plurality of chambers, including an open bottomed valve chamber between said partitions, said partitions having aligned valve ports, an integral bottom wall extending outwardly from the bottom of the vertical partition a curved bottom wall extending upwardly and outwardly from the lower edge of the inclined partition to the side wall, a valve member movably mounted in said valve chamber and adapted for closing engagement with either port, said valve member being differentiated in color from said valve body, retaining and hinge means for said valve member, including a bracket mounted on said vertical partition and extending toward said inclined partition, and securing means for said bracket, located on the side of said vertical partition opposite to said bracket, and readily accessible from outside of the valve body, and an outer housing surrounding said unitary valve body and formed of transparent material, whereby the relative position of said valve member in relation to said valve body may readily be observed through said outer housing, said outer housing being constituted by a single circumferentially extending body of transparent plastic material.

RALPH M. NELSON.